(12) United States Patent
Binek et al.

(10) Patent No.: US 11,377,977 B2
(45) Date of Patent: Jul. 5, 2022

(54) LUBRICATION NETWORK FOR AN ATTRITABLE ENGINE

(71) Applicant: Raytheon Technologies Corporation, Farmington, CT (US)

(72) Inventors: Lawrence A. Binek, Glastonbury, CT (US); Leslie F. Guzman, West Palm Beach, FL (US); Sean R. Jackson, Palm City, FL (US); Evan J. Butcher, Suffield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 85 days.

(21) Appl. No.: 16/736,385

(22) Filed: Jan. 7, 2020

(65) Prior Publication Data

US 2021/0207495 A1 Jul. 8, 2021

(51) Int. Cl.
*F01D 25/18* (2006.01)
*F01D 25/16* (2006.01)

(52) U.S. Cl.
CPC ............. *F01D 25/18* (2013.01); *F01D 25/16* (2013.01); *F05D 2260/98* (2013.01); *F16C 2360/23* (2013.01)

(58) Field of Classification Search
CPC ...... F01D 25/125; F01D 25/16; F01D 25/162; F01D 25/18; F05D 2240/50; F05D 2260/98; F16C 27/045; F16C 2360/23; F16C 33/6659; F16C 33/667; F16C 33/6674; F16C 33/6662
USPC ...................................................... 184/6.26
See application file for complete search history.

(56) References Cited

U.S. PATENT DOCUMENTS

| | | | | |
|---|---|---|---|---|
| 3,501,245 | A * | 3/1970 | Ivanko | F01D 11/025 184/6.11 |
| 4,971,184 | A * | 11/1990 | Lederman | F16D 13/74 192/45.006 |
| 7,194,866 | B1 | 3/2007 | Jones et al. | |
| 7,216,473 | B1 | 5/2007 | McArthur et al. | |
| 7,748,208 | B2 | 7/2010 | Jewess et al. | |
| 7,748,209 | B1 * | 7/2010 | Schopf | F01D 5/082 60/39.08 |
| 8,672,550 | B1 * | 3/2014 | Peterson | F16C 33/043 384/282 |
| 2014/0369811 | A1 * | 12/2014 | Malins | F01D 25/186 415/111 |

(Continued)

FOREIGN PATENT DOCUMENTS

| | | |
|---|---|---|
| CN | 108590859 A | 9/2018 |
| EP | 2815106 A2 | 12/2014 |

OTHER PUBLICATIONS

Extended European Search Report for EP Application No. 21150535.9, dated Jun. 1, 2021, pp. 9.

*Primary Examiner* — Woody A Lee, Jr.
*Assistant Examiner* — Elton K Wong
(74) *Attorney, Agent, or Firm* — Getz Balich LLC

(57) ABSTRACT

A gas turbine engine with a lubrication system includes a ball bearing assembly and a rotor circumscribing a rotational axis and journaled within the ball bearing assembly. The gas turbine engine also includes a lubrication system located radially outward from a rotational axis and radially outward and adjacent to the ball bearing assembly, which includes a lubrication channel having an inlet and an outlet and a dispersion cone adjacent to the outlet of the lubrication channel.

14 Claims, 2 Drawing Sheets

(56) References Cited

U.S. PATENT DOCUMENTS

2017/0298830 A1 10/2017 Ertas et al.
2019/0055854 A1 2/2019 Chenoux et al.

* cited by examiner

LUBRICATION NETWORK FOR AN ATTRITABLE ENGINE

BACKGROUND

The present disclosure relates generally to attritable aircraft engines. More specifically, this disclosure relates to a lubrication network of an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as limited lifetime vehicles, with expected lifetimes as short as a single use or single mission vehicle. As such, many components and features common in traditional piloted aircraft are unnecessary or can be simplified for attritable aircraft applications, including fluid dispensing systems.

Fluid dispensing system in aircraft systems can have five or more individual parts, each requiring assembly, which can be expensive and time consuming. Furthermore, cross drilling through the engine support structures has conventionally been used in order to create necessary fluid passageways, which adds additional labor and expense to the manufacturing process.

Proper lubrication is essential for a variety of engine components, including ball bearing assemblies. Improper lubrication can lead to over-heating of system critical parts, which can cause catastrophic failure. On the one hand, enough lubrication fluid must be provided to ensure sufficient cooling of the bearings under all working conditions of the gas turbine engine. On the other hand, excessive lubrication fluid may require larger fluid pumps and piping systems than necessary, increasing the footprint of the lubrication system and the overall cost and weight of the aircraft engine. Furthermore, pumping unnecessary lubrication fluid through an engine system uses energy that could be used elsewhere in the system. As such, providing too much lubrication fluid results in a less efficient gas turbine engine compared to a gas turbine engine provided with a proper amount of lubrication fluid.

SUMMARY

A gas turbine engine with a lubrication system includes a ball bearing assembly and a rotor circumscribing a rotational axis and journaled within the ball bearing assembly. The gas turbine engine also includes a lubrication system located radially outward from a rotational axis and radially outward and adjacent to the ball bearing assembly, which includes a lubrication channel having an inlet and an outlet and a dispersion cone adjacent to the outlet of the lubrication channel.

A method of manufacturing a gas turbine engine with a lubrication system includes journaling a rotor within a ball bearing assembly and circumscribing a rotational axis. The method also includes additively manufacturing a lubrication system located radially outward from a rotational axis and radially outward and adjacent to the ball bearing assembly, which has a lubrication channel with an inlet and an outlet and a dispersion cone adjacent to the outlet of the lubrication channel.

DETAILED DESCRIPTION

An attritable engine with an integrally built fluid dispensing system simplifies manufacturing. An attritable engine can leverage additive manufacturing techniques to improve various aspects of the limited-life engine. For example, additive manufacturing allows assembly details to be unitized, and simultaneously permits integration of many complex performance-enhancing features. The additive manufacture of the engine reduces the time to delivery to the customer and lowers the overall production costs of the unit.

Disclosed herein is a lubrication system having a dispersion cone configured to form a mist of lubricant, which evenly covers the exterior surface of the outer races. The evenly distributed lubricant cools ball bearing assemblies during operation of the engine. Furthermore, the lubrication system can be additively manufactured, obviating the need for cross-drilling of the compressor section and saving time and expense associated with cross-drilling operations. As such, unitizing the manufacturing and assembly details, while integrating complex performance-enhancing features using additive manufacturing techniques, lowers the overall production costs and manufacturing time.

Figure 1:
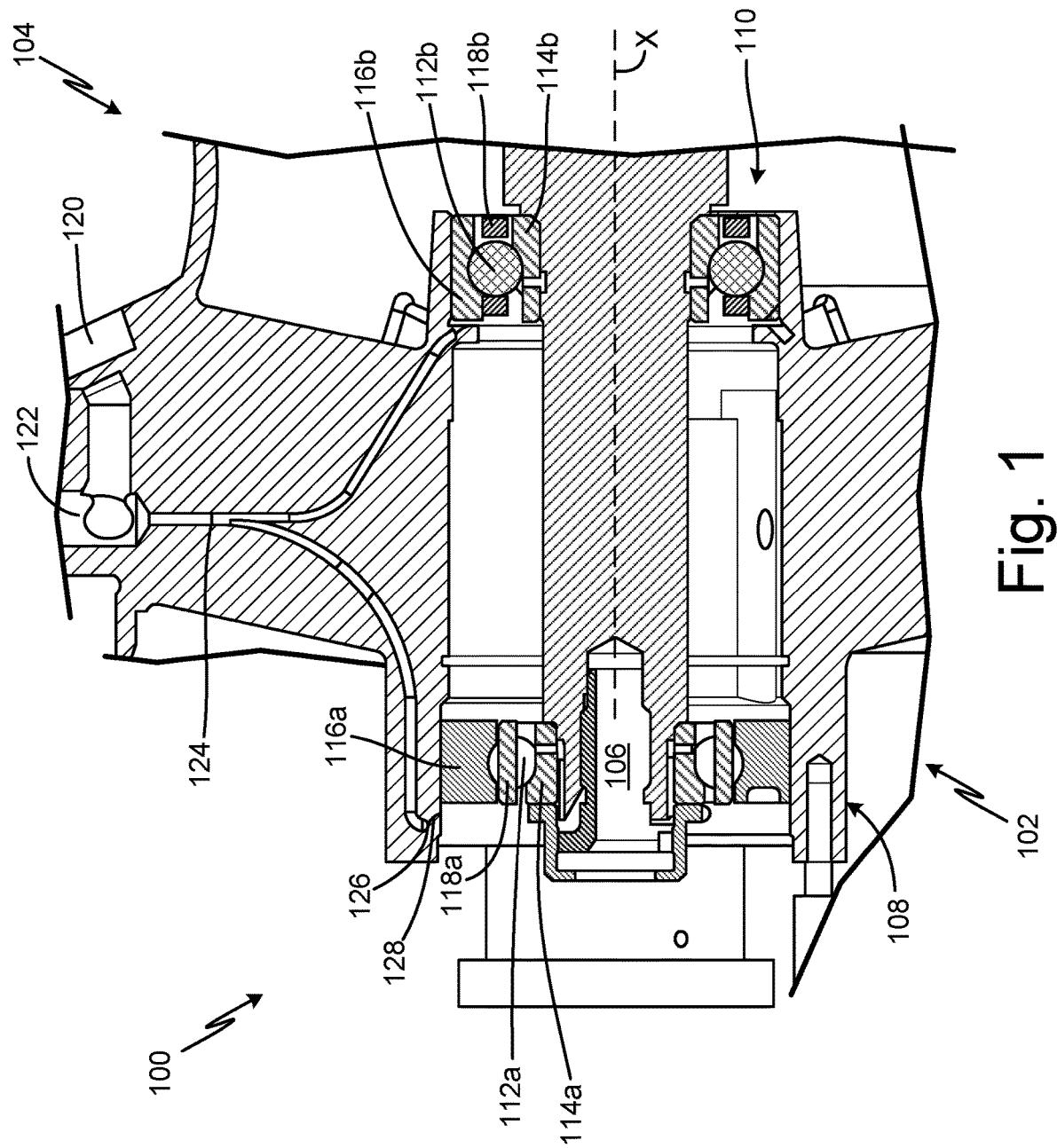
FIG. 1 is a cross-sectional view of an attritable engine with a lubrication system.

FIG. 1 shows attritable engine 100 including compressor section 102, lubrication system 104, rotor 106, forward ball bearing assembly 108, rearward ball bearing assembly 110, ball bearings 112a and 112b, inner races 114a and 114b, outer races 116a and 116b, retaining clips 118a and 118b, lubrication channel inlet 120, lubrication distribution rail 122, lubrication channel 124, lubrication channel outlet 126, and dispersion cone 128.

Compressor section 102 houses lubrication system 104 and rotor 106, which is journaled in forward ball bearing assembly 108 and rearward ball bearing assembly 110. Forward ball bearing assembly 108 includes ball bearing 112a surrounded by inner race 114a and outer race 116a and retained in place by retaining clip 118a. Similarly, rearward ball bearing assembly 110 includes ball bearing 112b surrounded by inner race 114b and outer race 116b and retained in place by retaining clip 118b.

Operationally, air enters the forward end of compressor section 102 and is compressed by compressor blades and vanes. Compressed air and fuel enter a combustor where the compressed air and fuel are mixed and ignited. The resulting high-temperature gas from the combustor enters a turbine section and drives the rotation of turbine blades, which in turn generates power by turning rotor 106 circumferentially about an axis of rotation. Gas exits the engine out of the aft end of an exhaust section.

Lubrication system 104 provides lubricant to forward and rearward ball bearing assemblies 108 and 110 from a lubricant source such as, for example, a fuel tank or an oil tank. Lubricant can be any fluid that provides cooling to bearings 112a and 112b such as, for example, fuel and oil. Lubricant enters lubrication system 104 from a lubricant source at lubricant channel inlet 120 and is delivered to lubrication distribution rail 122, which distributes lubricant to lubrication channel 124. Lubrication distribution rail 122 can distribute lubricant to more than one lubrication channel 124. One or more of the lubrication channels can have a curved shape along all, substantially all, or just part of its length. Lubrication distribution rail 122 circumferentially travels around the engine casing and may travel all the way around the engine casing or only partially around the engine casing, distributing lubricant to multiple lubrication channels 124.

Lubricant exits lubrication system 104 at lubrication channel outlet 126 and is dispersed in dispersion cone 128, which has a frustoconical shape and is configured to diffuse the lubricant as the lubricant travels through dispersion cone 128. Diffusion of the lubricant helps the lubricant form a fine mist. The lubricant exits dispersion cone 128 and is distributed on the exterior surface of outer races 116a and 116b. Dispersion cone 128 may also be referred to as a diffuser.

Figure 2:
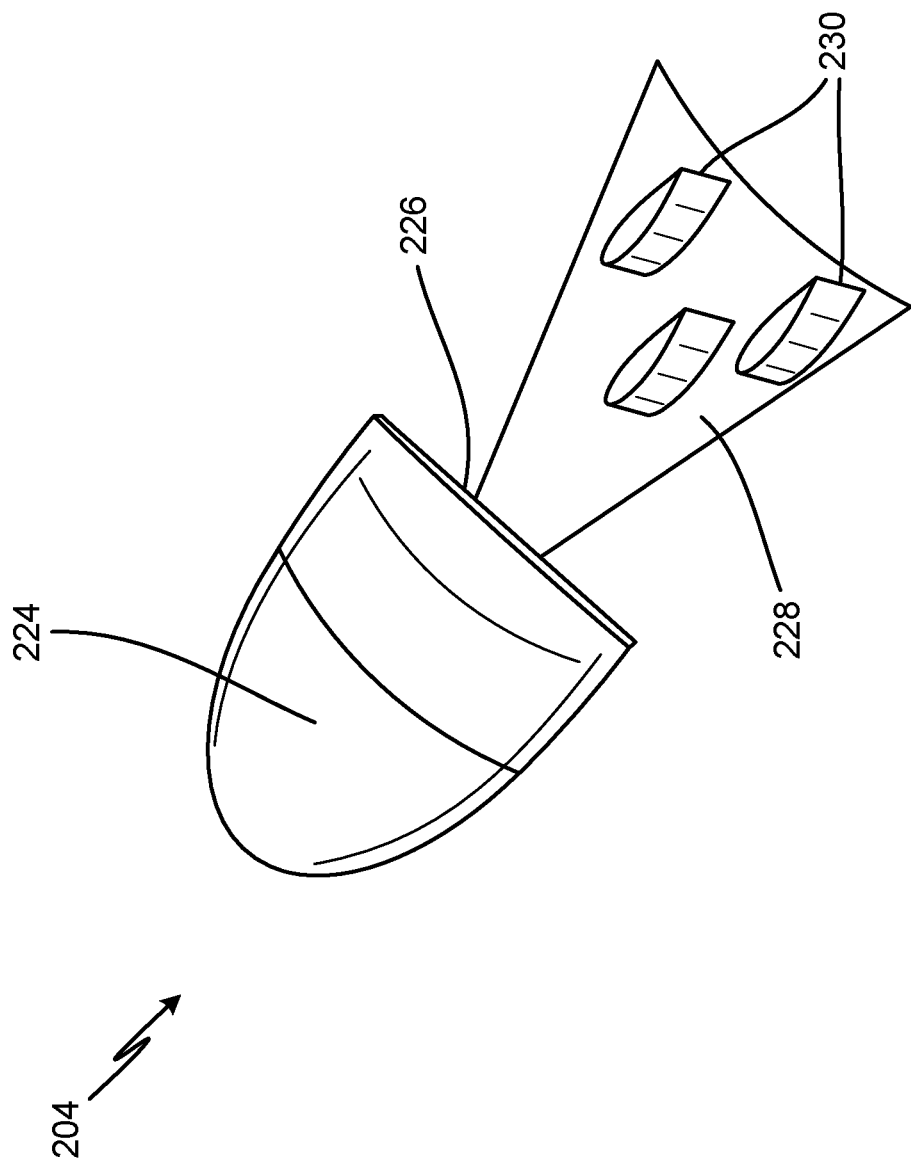
FIG. 2 is a cross-sectional view of a spray cone with an airfoil distribution array.

FIG. 2 is a cross-sectional view of a spray cone with an airfoil distribution array. FIG. 2 shows lubrication system 204 including lubrication channel 224, lubrication channel outlet 226, dispersion cone 228, and dispersion enhancements features 230. Lubrication system 204 depicts one embodiment of lubrication channel 124, lubrication channel outlet 126, and dispersion cone 128.

Lubricant exits lubrication channel 224 of lubrication system 204 at lubrication channel outlet 226 and is dispersed in dispersion cone 228, which has a frustoconical shape and is configured to diffuse the lubricant as the lubricant travels through dispersion cone 228. Dispersion enhancement features 230 increase the dispersion or atomization of the lubricant as the lubricant travels through dispersion cone 228 compared to a dispersion cone without any dispersion enhancement features.

Dispersion enhancement features 230 can have any geometry, size, or shape that increases the dispersion or atomization of the lubricant as the lubricant travels through dispersion cone 228. In one embodiment, as depicted in FIG. 2, dispersion enhancement features 230 have an airfoil shape. In other embodiments, dispersion enhancement features 230 can be spars, ramps, indentations, and combinations thereof.

Lubrication systems 104 and 204 can be formed of stainless steel. In other embodiments, lubrication systems 104 and 204 can be formed of aluminum, titanium, copper, cobalt, iron, nickel, and alloys thereof. Lubrication system 104 is built integral and conformal with attritable engine 100 and can be manufactured using additive manufacturing techniques such as laser powder bed fusion, electron beam melting, and glue binder jetting.

Lubrication systems 104 and 204 have dispersion cones configured to form a mist of lubricant. This mist evenly covers the exterior surface of the outer races, thereby efficiently cooling ball bearing assemblies during operation of the engine. Furthermore, these lubrication systems can be additively manufactured, which simplifies the manufacturing process by obviating the need for cross-drilling of the compressor section and allows for the lubrication channels to be curved in whole or in part. Forgoing subtractive manufacturing techniques such as drilling saves the time and expense associated with subtractive manufacturing operations. As such, unitizing the manufacturing and assembly details, while integrating complex performance-enhancing features using additive manufacturing techniques, lowers overall production costs and engine manufacturing time.

Discussion of Possible Embodiments

The following are non-exclusive descriptions of possible embodiments of the present invention.

A gas turbine engine with a lubrication system includes a ball bearing assembly and a rotor circumscribing a rotational axis and journaled within the ball bearing assembly. The gas turbine engine also includes a lubrication system located radially outward from a rotational axis and radially outward and adjacent to the ball bearing assembly, which includes a lubrication channel having an inlet and an outlet and a dispersion cone adjacent to the outlet of the lubrication channel.

The gas turbine engine of the preceding paragraph can optionally include, additionally and/or alternatively, any one or more of the following features, configurations and/or additional components:

The ball bearing assembly of the gas turbine engine includes an inner race attached to the rotor, a ball bearing adjacent to and located radially outward of the inner race, an outer race adjacent to and located radially outward of the ball bearing, and a retaining clip adjacent to the outer race and configured to retain the ball bearing assembly in place.

The dispersion cone is adjacent to an exterior surface of the ball bearing assembly and configured to evenly coat the ball bearing assembly with a lubricant.

The dispersion cone of the gas turbine engine includes a dispersion enhancement feature.

The dispersion enhancement feature is at least one airfoil shaped spar.

The dispersion enhancement feature is at least one of a spar, ramp, indentation, and combinations thereof.

The dispersion enhancement feature is configured to provide a mist to evenly coat the exterior surface of the ball bearing assembly with a lubricant.

The dispersion cone has a frustoconical shape with a base that is adjacent to the ball bearing assembly and an apex that is adjacent to the outlet of the lubrication channel.

The dispersion cone is oriented with the base of the frustoconical shape adjacent to the ball bearing assembly and the apex of the frustoconical shape adjacent to the outlet of the lubrication channel.

At least a portion of the length of the lubrication channel is curved.

The lubrication system is part of the housing of the compressor of the gas turbine engine.

A method of manufacturing a gas turbine engine with a lubrication system includes journaling a rotor within a ball bearing assembly and circumscribing a rotational axis. The method also includes additively manufacturing a lubrication system located radially outward from a rotational axis and radially outward and adjacent to the ball bearing assembly, which has a lubrication channel with an inlet and an outlet and a dispersion cone adjacent to the outlet of the lubrication channel.

The method of the preceding paragraph can optionally include, additionally and/or alternatively, any one or more of the following features, configurations and/or additional components:

The method includes additively manufacturing the rotor and additively manufacturing the ball bearing assembly.

The dispersion cone is adjacent to an exterior surface of the ball bearing assembly and configured to evenly coat the ball bearing assembly with a lubricant.

The dispersion cone includes a dispersion enhancement feature.

The dispersion enhancement feature is at least one airfoil shaped spar.

The dispersion enhancement feature is at least one of a spar, ramp, indentation, and combinations thereof.

The dispersion enhancement feature is configured to provide a mist to evenly coat the exterior surface of the ball bearing assembly with a lubricant.

The dispersion cone has a frustoconical shape, oriented with the base of the frustoconical shape adjacent to the ball bearing assembly and the apex of the frustoconical shape adjacent to the outlet of the lubrication channel.

At least a portion of the length of the lubrication channel is curved.

The lubrication system is part of the housing of the compressor of the gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine, the gas turbine engine comprising:
   a ball bearing assembly;
   a rotor circumscribing a rotational axis and journaled within the ball bearing assembly; and
   a lubrication system located radially outward from the rotational axis and radially outward and adjacent to the ball bearing assembly, the lubrication system comprising:
      a lubrication channel having an inlet and an outlet; and
      a dispersion cone adjacent to the outlet of the lubrication channel, wherein the dispersion cone comprises at least one airfoil shaped spar on an interior of the dispersion cone, the at least one airfoil shaped spar is integral to the dispersion cone, and the at least one airfoil shaped spar is configured to increase dispersion of a lubricant traveling through the dispersion cone.

2. The gas turbine engine of claim 1, the ball bearing assembly further comprising:
   an inner race attached to the rotor;
   a ball bearing adjacent to and located radially outward of the inner race;
   an outer race adjacent to and located radially outward of the ball bearing; and
   a retaining clip adjacent to the outer race and configured to retain the ball bearing assembly in place.

3. The gas turbine engine of claim 1, wherein the dispersion cone is adjacent to an exterior surface of the ball bearing assembly and configured to evenly coat the ball bearing assembly with the lubricant.

4. The gas turbine engine of claim 3, wherein the at least one airfoil shaped spar is configured to provide a mist to evenly coat the exterior surface of the ball bearing assembly with the lubricant.

5. The gas turbine engine of claim 1, wherein the dispersion cone has a frustoconical shape with a base that is adjacent to the ball bearing assembly and an apex that is adjacent to the outlet of the lubrication channel.

6. The gas turbine engine of claim 1, wherein at least a portion of a length of the lubrication channel is curved.

7. The gas turbine engine of claim 1, wherein the lubrication system is part of a housing of a compressor of the gas turbine engine.

8. A method of manufacturing a gas turbine engine, the method comprising:
   journaling a rotor within a ball bearing assembly and the rotor circumscribing a rotational axis; and
   additively manufacturing a lubrication system located radially outward from the rotational axis and radially outward and adjacent to the ball bearing assembly, the lubrication system comprising:
      a lubrication channel having an inlet and an outlet; and
      a dispersion cone adjacent to the outlet of the lubrication channel, wherein the dispersion cone comprises at least one airfoil shaped spar on an interior of the dispersion cone, the at least one airfoil shaped spar is integral to the dispersion cone, and the at least one airfoil shaped spar is configured to increase dispersion of a lubricant traveling through the dispersion cone.

9. The method of claim 8, further comprising:
   additively manufacturing the rotor; and
   additively manufacturing the ball bearing assembly.

10. The method of claim 8, wherein the dispersion cone is adjacent to an exterior surface of the ball bearing assembly and configured to evenly coat the ball bearing assembly with the lubricant.

11. The method of claim 10, wherein the at least one airfoil shaped spar is configured to provide a mist to evenly coat the exterior surface of the ball bearing assembly with the lubricant.

12. The method of claim 8, wherein the dispersion cone has a frustoconical shape, oriented with a base of the frustoconical shape adjacent to the ball bearing assembly and an apex of the frustoconical shape adjacent to the outlet of the lubrication channel.

13. The method of claim 8, wherein at least a portion of a length of the lubrication channel is curved.

14. The method of claim 8, wherein the lubrication system is part of a housing of a compressor of the gas turbine engine.

* * * * *